Sept. 25, 1956  U. BELLOMETTI  2,763,924
PROCESS AND APPARATUS FOR MANUFACTURING TUBES, TANKS
AND HOLLOW BODIES GENERALLY FROM
METAL IN SHEET OR BAND FORM
Filed Dec. 29, 1953
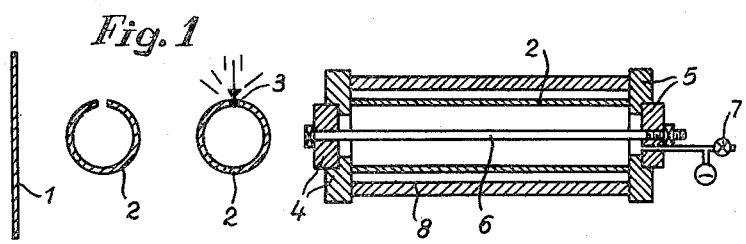
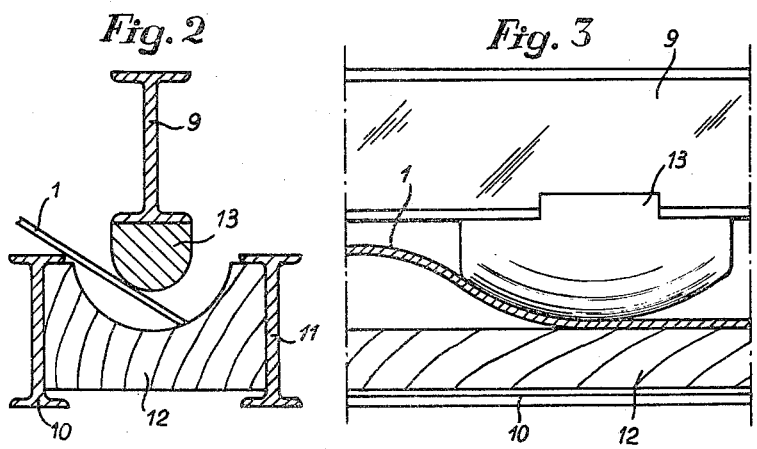
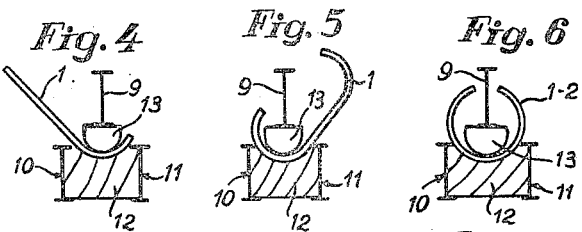
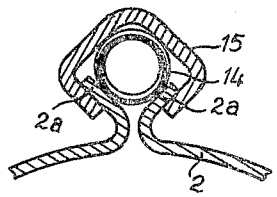
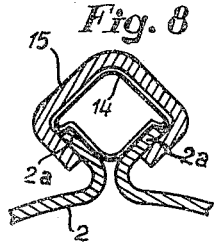

United States Patent Office 2,763,924
Patented Sept. 25, 1956

2,763,924

PROCESS AND APPARATUS FOR MANUFACTURING TUBES, TANKS AND HOLLOW BODIES GENERALLY FROM METAL IN SHEET OR BAND FORM

Ugo Bellometti, Turin, Italy

Application December 29, 1953, Serial No. 400,952

Claims priority, application Italy December 31, 1952

4 Claims. (Cl. 29—548)

This invention relates to the manufacture of pipes, containers and hollow bodies of metal.

The invention has for its object the manufacture of pipes and containers of a desired diameter and wall thickness from metal in sheet or band form by means of tools and testing devices which are simple and portable, so that they can be used without employing skilled personnel along the piping for which the pipes are intended, such as water, gas, oil pipings and the like, the pipes manufactured thereby meeting all requirements imposed thereon.

It is known to manufacture pipes and hollow bodies of a desired cross sectional shape, preferably, however, of circular cross section by first bending from sheet metals bodies which are of approximately the desired cross sectional form. The hollow body may be of one piece or composed of a plurality of sections according to circumstances in each case. The pre-bent hollow body is thereupon welded or otherwise tightly connected at the junction lines, whereupon its two front ends are tightly closed by suitable closing means, such as plugs, plates or the like. The pipe or the like prepared as above is now placed into a mould such that its inner hollow matches the desired external section of the hollow body to be manufactured. The pipe or the like, which is closed at both ends, is filled through a suitable opening with a liquid, mostly water, and a pressure is generated for instance by means of a hydraulic press, of such magnitude that the pipe or the like is deformed and closely adheres to the mould surrounding the pipe.

The difficulties in carrying out the process outlined above consisted in the bending of the sheet metal to be brought to pipe form, for larger wall thicknesses necessitate relatively high forces. When pipes are manufactured in the factory, bending does not meet with any difficulty, for suitable bending machines of various types can be made available. However, bending of the pipe at the place where it is used meets with considerable difficulties, for suitable bending machines are only very rarely available and the transport of such bending machines to the place of erection is practically out of the question on account of its heavy weight.

This invention solves the above described difficulties by providing a bending device which can be easily assembled at the place of use or erection and adapted to various conditions.

According to this invention the process for manufacturing pipes and the like by bending sheet metal consists in conferring to the metal sheets to be bent, which are placed from the top into an open mould of desired cross sectional shape by repeatedly pressing the sheet into the mould, proceeding from one end of the sheet metal towards the other in the direction of the pipe axis.

The apparatus required for carrying out this process comprises a frame with three parallel metal rails connected together at their ends, two of said rails laterally encircling the mould, the third rail being arranged over the mould and serving to guide the slidable bending tool suspended to the rail. While the abovementioned three rails are made of metal, as a rule iron rails, the mould can be made of wood, since it is subjected to pressure stresses only. The bending tool, which is guided along the third rail, is of approximately semi-oval form. Alternatively, it can be made of wheel, ball or other suitable form.

The pre-bent sheet metal according to this invention is further worked in a known manner. The metal sheets are welded along their longitudinal junction line or lines, the open ends of the pipes are closed in a pressure-tight manner, one of the closing members being fitted with a supply conduit for the filling liquid. The further process has already been mentioned above. It should be noted that an advantage of this invention resides in the fact that the liquid pressure will not only effect shaping but also test tightness.

The invention is illustrated on the accompanying drawing.

Fig. 1 is an overall view.

Figs. 2 and 3 show the sheet metal bending device in cross and longitudinal section, respectively.

Figs. 4 to 6 show three successive stages of the bending process.

Figs. 7 and 8 show two successive steps of the connection of the bent over sheet metal edges by fitting a longitudinally extending packing.

In the overall view shown in Fig. 1, 1 denotes a sheet metal, bent by a suitable process to cause its edges to abut, as shown in Fig. 2, its cross sectional being approximately circular. The abutting edges of the pipes 2 are connected together by welding at 3 or otherwise by suitable connecting means, as described hereafter with reference to Figs. 7 and 8. The pipe ends are then closed by plugs 4 and 5, which are held together by means of a tie rod 6. A liquid, mostly water is pumped under pressure into the pipe by means of a pump 7, whereby the pipe 2 is brought from its cross section conferred by the bending step, to a uniformly circular cross section throughout its length, next to its correct size by pressing against the internal profile of the mould 8, the latter surrounding the pipe and being held in this position by the end plugs 4 and 5.

During the last-mentioned step tightness is simultaneously tested, for any leakage becomes apparent under the applied pressure.

In the construction shown in Figures 2 to 6 the sheet metal is brought into the mould 2 by a device shown in Figures 2 and 3. This device comprises three I-shaped girders 9, 10 and 11, connected together at their ends. A mould 12, which may be of wood, is arranged between the two lower girders 10 and 11.

Bending is performed by a semi-oval member 13 which is moved longitudinally underneath the girder 9.

The bending member can be of a construction other than shown, for instance, in the form of a wheel or a ball of variable diameter.

The sheet metal 1 is placed between the mould 12 and bending tool 13 which receives a suitable movement.

In the manufacture of a pipe, the sheet metal is for instance first bent by one third, as shown in Figure 4. Successively, it is bent by a further third, as shown in Figure 5, finally it is bent in the middle to the pipe shown in Figure 6.

Figures 7 and 8 show a connection other than by welding, by means of annular member 14 of easily deformable material, for instance soft iron or copper of small diameter. This member is arranged between the two upper bent over edges 2a of the pipe and a member 15 acting as reaction member and fish-plate. The tubular member 14 is deformed by hydraulic pressure, as shown in Figure 8 and consequently takes the profile of the gap between the bends 2a and profile 15. This affords a sufficiently firm and tight closure of the pipe.

What I claim is:

1. Process for manufacturing hollow bodies, the peripheral surface of which is in the form of a revolution surface, preferably pipes, by bending a metal sheet consisting in a repeated compression of the sheet metal into a trough-shaped open mould, said compression acting on the sheet metal progressively from one end to the other in the direction of the longitudinal axis of said mould.

2. Apparatus for manufacturing hollow bodies, the peripheral surface of which is in the form of a revolution surface, comprising a lower frame carrying a matrix in the form of a concave mould, a top guide frame, and a slidable bending tool suspended thereto, said top frame being so arranged that the bending tool is slidable along the middle plane of the matrix.

3. Apparatus as claimed in claim 2, wherein the lower frame consists of two parallel I-shaped metal beams laterally embracing the mould, the top guide frame consisting of a third I-shaped metal beam arranged over said mould panel parallel with said beams embracing the mould.

4. Apparatus as claimed in claim 2, wherein said bending tool consists of a semi-oval body of non-uniform diameter.

References Cited in the file of this patent

UNITED STATES PATENTS

| | | |
|---|---|---|
| 1,756,403 | Thomson | Apr. 29, 1930 |
| 1,879,009 | Anthony | Sept. 27, 1932 |
| 2,025,922 | Weinrich | Dec. 31, 1935 |
| 2,615,411 | Clevenger | Oct. 28, 1952 |
| 2,671,339 | Krause | Mar. 9, 1954 |